US007022198B2

(12) United States Patent
Bruce et al.

(10) Patent No.: US 7,022,198 B2
(45) Date of Patent: Apr. 4, 2006

(54) MICROWAVE ASSISTED REACTIVE BRAZING OF CERAMIC MATERIALS

(75) Inventors: Ralph W. Bruce, Arnold, MD (US); David Lewis, III, Alexandria, VA (US); Manfred Kahn, Myrtle Beach, SC (US); Arne W. Fliflet, Alexandria, VA (US); Steven H. Gold, New Carrollton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/672,271

(22) Filed: Sep. 26, 2003

(65) Prior Publication Data

US 2004/0173304 A1   Sep. 9, 2004

Related U.S. Application Data

(60) Provisional application No. 60/455,204, filed on Mar. 7, 2003.

(51) Int. Cl.
*C04B 37/00* (2006.01)
*B32B 37/06* (2006.01)

(52) U.S. Cl. ................. 156/89.11; 156/272.2
(58) Field of Classification Search ............ 156/89.11, 156/272.2; 219/678; 65/33.1, 33.2, 43
See application file for complete search history.

(56) References Cited

U.S. PATENT DOCUMENTS

| | | | | |
|---|---|---|---|---|
| 4,347,089 A | * | 8/1982 | Loehman | 156/89.27 |
| 4,529,857 A | * | 7/1985 | Meek et al. | 264/432 |
| 4,606,748 A | * | 8/1986 | Blake et al. | 65/36 |
| 4,757,172 A | * | 7/1988 | Palaith et al. | 219/686 |
| 4,767,902 A | * | 8/1988 | Palaith et al. | 219/706 |
| 4,772,770 A | * | 9/1988 | Matsui et al. | 219/686 |
| 5,072,087 A | * | 12/1991 | Apte et al. | 219/759 |
| 5,407,119 A | * | 4/1995 | Churchill et al. | 228/124.5 |
| 6,054,693 A | * | 4/2000 | Barmatz et al. | 219/678 |
| 6,054,700 A | * | 4/2000 | Rokhvarger et al. | 219/759 |
| 6,221,499 B1 | * | 4/2001 | Gasse et al. | 428/457 |
| 6,532,769 B1 | * | 3/2003 | Meinhardt et al. | 65/33.5 |
| 6,616,032 B1 | * | 9/2003 | Gasse et al. | 228/248.1 |

FOREIGN PATENT DOCUMENTS

EP        0 932 327        *   7/1999

(Continued)

OTHER PUBLICATIONS

A.J. Moorhead, H. Kim, Engineered Materials Handbook vol. 4: Ceramics and Glass, Joining Oxide Ceramics, ASM International, p 511-321 (1991).

(Continued)

*Primary Examiner*—Melvin Mayes
(74) *Attorney, Agent, or Firm*—John J. Karasek; Sally A. Ferrett

(57) ABSTRACT

A method for joining similar materials to create multi-component assemblies so the joint materials share similar physical, chemical, and electrical characteristics with the base materials. The method includes aligning the materials, applying joining material, focusing a microwave beam on the joint area to initially heat the joint area to allow the joining material to soften and fill physical discontinuities while the surrounding surfaces remains cool, rapidly heating the joint area to the reactive area of the joining material, rapidly cooling the joint area and maintaining the joint area at a recrystallization temperature. The materials can be ceramics such as aluminum oxide.

32 Claims, 4 Drawing Sheets

FOREIGN PATENT DOCUMENTS

| JP | 63-239164 | * | 10/1988 |
|---|---|---|---|
| JP | 08-217558 | * | 9/1996 |

OTHER PUBLICATIONS

Bruce, R.W., Fliflet, A.W., Fischer, R.P., Lewis, D., Bender, B.A., Chow, G.M., Rayne, R.J., Kurihara, L.K., and Schoen, P.E., "Millimeter-Wave Processing of Alumina Compacts," in Microwaves: Theory and Application in Materials Processing IV: First World Congress on Microwave Processing: Microwave and RF Technology—From Science to Application, Ceram. Trans. vol. 80, pp 287-294, 1997.

Bruce, R.W., Fliflet, A. W., et al. "Microwave Sintering of Pure and Doped Nanocrystalline Alumina Compacts," MRS Symp. Proc., 430, 139 (1996).

Fliflet, A.W., Bruce, R.W., Fischer, R.P., Lewis, D., Kurihara, L.K., Bender, B.A., Chow, G.M., and Rayne, R.J., "A Study of Millimeter-Wave Sintering of Fine-Grained Alumina Compacts", IEEE Transactions on Plasma Science, 28(3), 924-935 (2000).

Fliflet, A.W., Bruce, R.W., Lewis, D., Bender, B.A., Kurihara, L.K., "A Study of Millimeter-Wave Sintering of Fine-Grained Alumina Compacts", NRL/FR/6790-98-9884.

Fliflet, A.W., Bruce, R.W., Kinkead, A.K., Fischer, R.P., Lewis, D., Rayne, R., Bender, B., Kurihara, L.K., Chow, G.M., and Schoen, P.E., "Application of Microwave Heating to Ceramic Processing: Design and Initial Operation of a 2.45-GHz Single-Mode Furnace," IEEE Transactions on Plasma Science, 24(3), 1041-1049 (1996).

Gold, S.H., Lewis, D.A., Fliflet, A.W., Hafizi, B., Penano, J.R., "Interference and Guiding Effects in the Slabs and Joints with Millimeter Wave Heating of Ceramic Radiation," Journal of Materials Synthesis and Processing, 9(5), 287-297 (2001).

Lewis, D., Rayne, R.J., Bender, B., et al., "Conventional and high frequency microwave processing of nanophase ceramic materials," Nanostructured Materials 9 (1-8): 97-100, 1997.

Kurihara, L.K., Lewis, D., Imam, M.A., Jung, A., Fliflet, A.W., "Millimeter Wave Driven Polyol Processing of Nanocrystalline Metals," Abstracts of Papers of the American Chemical Society 221 112-IEC Washington, DC: American Chemical Society, 2001.

Kurihara, L.K., Lewis, D., Flilflet, A.W., Bruce, R.W., "Millimeter Wave Gyrotron Processing of Nanocrystalline Metallic Films and Powders Using the Polyol Process," Abstracts of Papers of the American Chemical Society, 220 144-IEC (2000).

Kurihara, L.K., Lewis, D., Imam, M.A., et al., "Millimeter wave driven polyol processing of nanocrystalline metals," Abstracts of Papers of the American Chemical Society, 221: 112-IEC Part 1 (2001).

Lewis, D., Imam, M.A., Kurihara, L.K., Fliflet, A.W., Kinkead, A., Miserendino, S., Egorov, S., Bruce, R.W., Gold, S., Jung, A.M., "Materials Processing with a High Frequency Millimeter-Wave Source," Materials and Manufacturing Processes, 18(2), 151-167, Mar. 2003.

* cited by examiner

MICROWAVE ASSISTED REACTIVE BRAZING OF CERAMIC MATERIALS

The present application claim the benefit of the priority filing date of provisional patent application No. 60/455,204 filed on 7 Mar., 2003, hereby incorporated, in its entirety, by reference.

FIELD OF THE INVENTION

This invention relates in general to the field of ceramics and in particular to the field of bonding high strength or high temperature ceramics.

BACKGROUND OF THE INVENTION

With the advent of new high tech materials, such as high temperature/high strength ceramics, the efficient joining of these materials is a major technical issue and very important to wide use of these materials. Many of these materials cannot be produced in large component sizes. Consequently, use of such materials in large scale devices requires joining of smaller components into assemblies of the required size.

Also it is difficult, if not impossible, to make high performance ceramic materials in complex shapes. The joining of simpler shapes on the other hand allows the preparation of more complicated shaped high performance ceramic parts, provided that the joints and surrounding regions exhibit, at all required operating conditions, the same strength and durability as the basic ceramic material.

Another difficulty with large scale ceramic assemblies or components can be their relative fragility compared to other metal or polymeric structures. Shipping of such large assemblies from the site of manufacture to the site of use may well result in damage to the assembly and large replacement cost. One remedy for these problems is a robust capability for joining high temperature ceramics. This capability should include techniques for joining subassemblies in a production facility, but should also be capable of being used in a field setting, at the site of use.

One example of such a requirement is the production of large silicon carbide (SiC) heat exchanger assemblies for hot gas recuperation. This requires assembly of various tube segments, couplers, manifolds and other SiC and metal components into the large heat exchanger assembly. The joints must have sufficient strength to withstand the process pressures and handling during installation, and must also be gas tight. Another example is an accelerator application where there is a need to assemble a series of hot-pressed, high purity alumina tube segments, each about 3–4 cm in length, into a meter long dielectric-loaded accelerator assembly. In this case the joints need to have similar dielectric properties as the alumina, including very low loss and high breakdown voltage, and a pore free structure.

Another application is for joining ceramics plates to create complex structures such as conformal ceramic armor. If a low cost and efficient way to join ceramic plates such that the joint area shares similar physical and chemical characteristics with the base materials was available, complex, light weight multi-component assemblies could be assembled to conform to structures such as seats, engines, gearboxes or etc.

Hence, there exists a need to be able to join high performance ceramics, where the joint area shares the same or similar physical and chemical characteristics with the base materials.

SUMMARY OF THE INVENTION

A multi-component assembly featuring a structure with joints that share physical, chemical and electrical characteristics with the base materials and a process for creating a multi component structure by bonding base material parts using localized microwave energy and featuring the steps of:

Applying a thin coating of a joining material to each surface of the base materials to be joined; disposing each of the base materials such that the coated surfaces of the base materials being joined are in intimate contact in the desired alignment, and the pressure necessary to maintain the intimate contact and the desired alignment when joining the base materials and creating the desired component assembly; heating the joint area with a microwave beam applied to the surfaces of the base material being joined and focusing or diffusing the microwave beam to achieve localized heating of the joint area; heating the joint area to an initial joining temperature, wherein the joining material softens and fills physical discontinuities between the surfaces of the base materials being joined; rapidly heating the joint area to the reactive temperature of the joining material and the base materials; maintaining the joint area at the reactive temperature for a short interval to allow for the interdiffusion of the base and joining materials and formation of a homogenous joint region; rapidly cooling the joint area to a recrystalization temperature and maintaining the joint area at the recrystalization temperature for a predetermined period; slowly cooling the joint area to room temperature, wherein the resulting component structure features joint region having similar physical, thermal and electrical characteristics as the base materials.

DETAILED DESCRIPTION

Prior to a detailed description of the illustrations a brief overview of the process and of the resulting structure may be appropriate: Disclosed is a method for joining material to efficiently create multi component assemblies in which the joints between the various components have virtually the same physical, chemical and electrical characteristics as the base materials. The process for creating such multi component structures uses a thin layer of a selected joining material applied to the juncture and localized microwave energy focused thereon to bond the component materials, and to diffuse away the joining material into the base material.

A thin coating of the joining material is applied to the surfaces of the base materials being joined. The base materials are disposed in relation to each other such that the two surfaces of the base materials being joined are in contact with each other and feature the desired alignment, and pressure necessary for maintaining the contact and the alignment required for the desired component assembly. The actual magnitude of the pressure applied during joining makes a minor contribution to the amount of materials diffusion that causes the joining during the heating process. Temperature and duration of the heating and cooling cycles are its primary determinants.

A microwave beam is focused on the joint area. The joint area is the area defined by the surfaces of the base material being joined. The microwave beam incident on the joint area is focused to achieve localized heating of the joint area. The surfaces beyond the joint area remain cool.

The joint area is heated to an initial joining temperature, wherein the joining material softens and fills physical discontinuities between the surfaces of the base materials being joined. The materials can be held at this temperature for about 15 minutes The joint area is then rapidly heated to the reactive temperature of the joining material and the base materials. The joint area is maintained at the reactive temperature for a short interval to allow for the reaction and interdiffusion of the base and joining materials and for the subsequent formation of a homogenous joint region.

Next the joint area is rapidly cooled to a recrystalization temperature, typically well below the initial softening temperature, and the joint area is maintained at the recystalization temperature for a predetermined period. This allows the joint region, now featuring the base materials regions interdiffused with each other and with the joining material, to form a homogeneous stable physical and thermal structure having uniform grain sizes. This process can be used to create very complex structures through sequential joining since the previous made joints are not significantly heated. Even if their temperature is increased, their properties would not be affected any differently than those of the base material, since the joining material by that time is expected to have diffused away.

Figure 1:
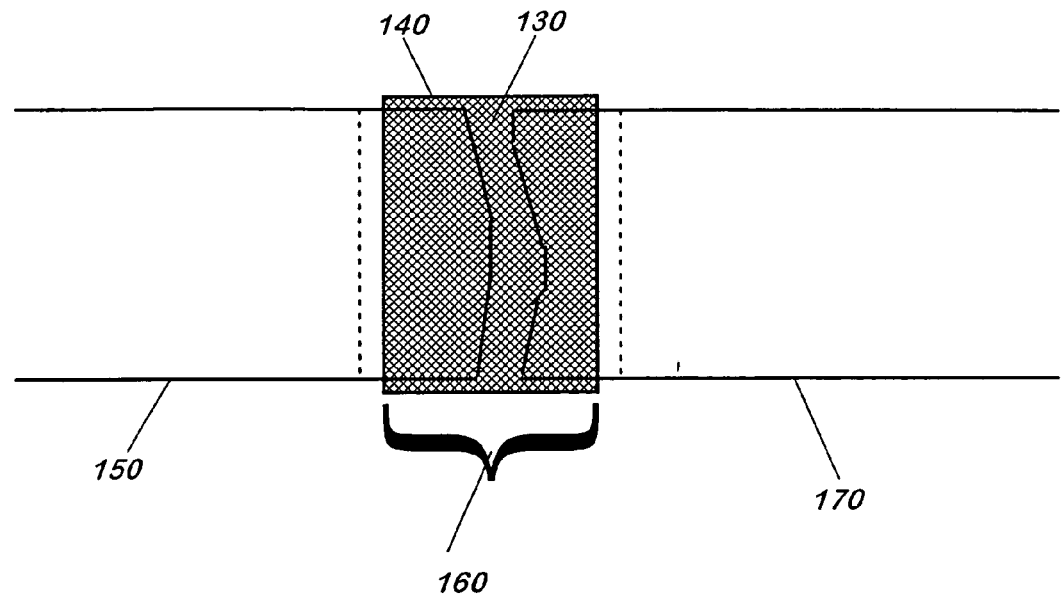
FIG. 1 shows the joint structure featuring the joining material applied to the surface of the base materials being joined.

With reference to the figures in which like reference numbers denote like elements, FIG. 1 illustrates an example joint structure featuring the joining material applied to the surface of the base materials being joined. The process for bonding the base materials and creating the seamless joint structure employs localized microwave energy for heating. The microwave energy is focused on the joint area, causing the localized heating of the selected area only. The other surfaces of the base materials remain near the ambient temperature.

FIG. 1 shows an example embodiment of the joint structure during the initial steps of the joining process. Base materials, 150, 170 are disposed to be in intimate contact with each other after a joining material 140 is applied to the joint area 160 of the base materials 150, 170 being joined.

Generally the base materials 150, 170 comprise high temperature ceramics which may be similar or dissimilar in chemical composition, shape and attributes. In a preferred embodiment these base materials are high temperature ceramics having a purity of greater than 99%. The base materials may be high temperature ceramics in the form of high purity oxide materials, however oxides are not required. In addition, the base material may be dissimilar materials.

As illustrated in FIG. 1, a thin coating of a joining material 140 is applied to each surface of the base materials, 150 and 170 being joined. The coating is applied to the joint region 160, specifically to the joint surfaces 130 of the base materials to be joined.

The joining material is a frit or reactive braze selected such that at a predetermined temperature the constituents of the joining material will chemically react and interdiffuse with the base material. As a result of the flit or braze constituents diffusing away into the base materials, their concentration is reduced to undetectable levels, so that only the high temperature ceramic material remains, including in the joint area. The joining material is chosen to be chemically reactive with the base material at a temperature below that of the thermal degradation threshold of the base material.

In an example embodiment, wherein the base materials are high temperature oxides, the joining material would preferably be an oxide glass frit. The use of such joint material permits assembly with minimal bonding pressure, since the glass initially softens and flows during the bonding process. The use of an oxide glass frit also relaxes the requirements for fit and finish in joints—surface flatness and roughness, since the reactive glass frit can fill surface irregularities in the joint. With the use of localized heating, the process can be used to create complex, multi surface structures through sequential heating, since previously made joints are homogenized by the diffusion process to have essentially the same composition and high temperature tolerance as the original base ceramic.

Figure 5:
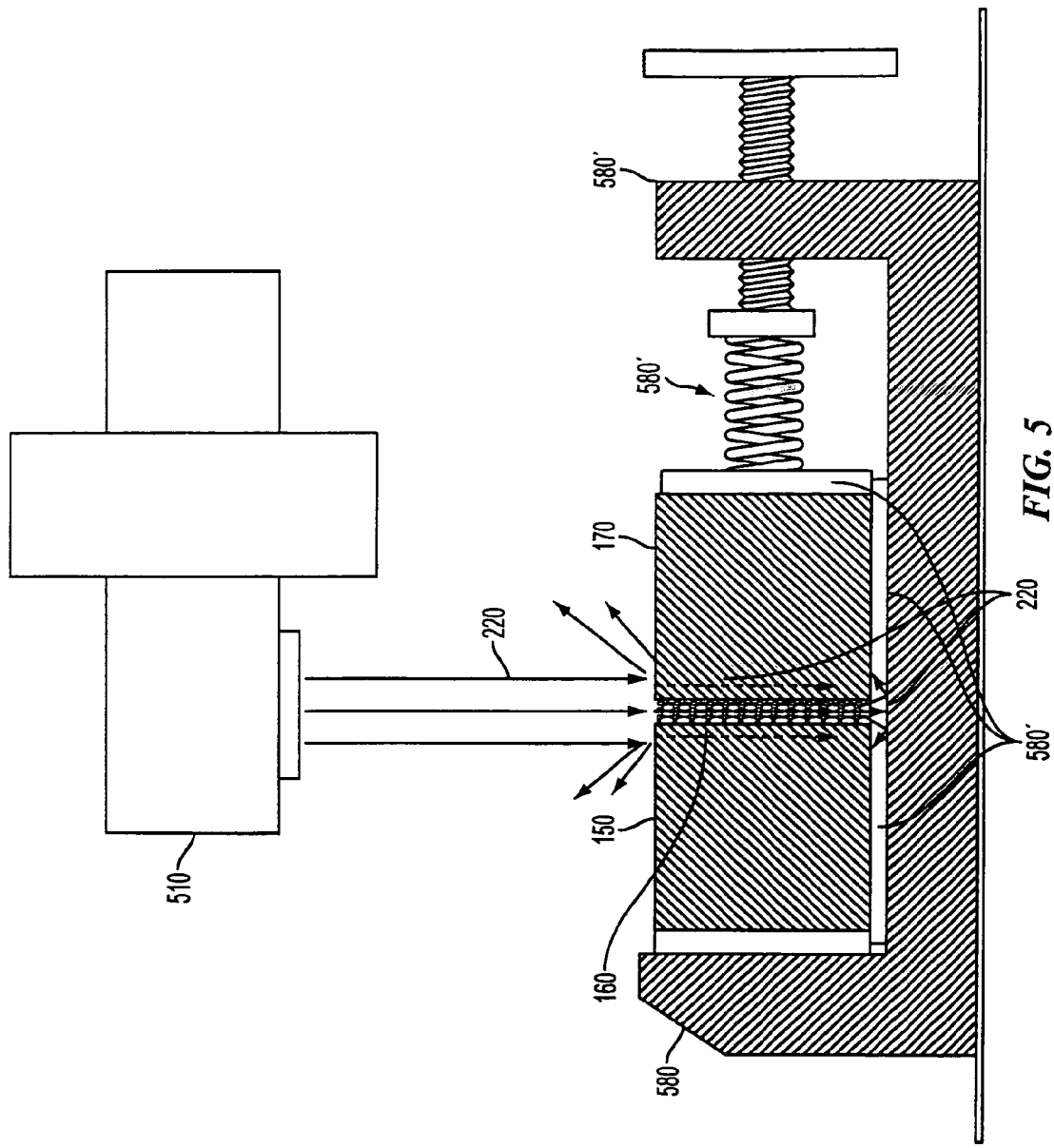
FIG. 5 shows an example configuration of an apparatus for performing the microwave seamless joint bonding process at the heating stage.

Referring again to FIG. 1 and to FIG. 5, each base material 150, 170 is disposed such that the surface of the base materials being joined 130 are in contact, with the desired alignment, and pressure necessary for joining the base materials and creating the desired component assembly. FIG. 5 illustrates an example system as employed to create a multi component assembly according to the method described herein. Fixtures 580, 580' are employed to dispose each piece of base material 150, 170 such that the surface of the base materials being joined are in contact with the desired alignment, and pressure necessary for joining the base materials 150, 170 and creating the desired component assembly.

The fixtures 580, 580' may be low temperature-type fixtures and are used to position the respective pieces of the base materials 150, 170 with the desired alignment and pressure to create the desired joined structure.

Once the base materials 150, 170 have been coated at the surfaces to be joined and aligned, the next phase involves heating the joint area 160 with a microwave beam 220 applied to the surfaces of the base material being joined. The heating effect may be controlled by focusing or diffusing the microwave beam 220 to achieve localized heating of the joint area 160.

Figure 2:
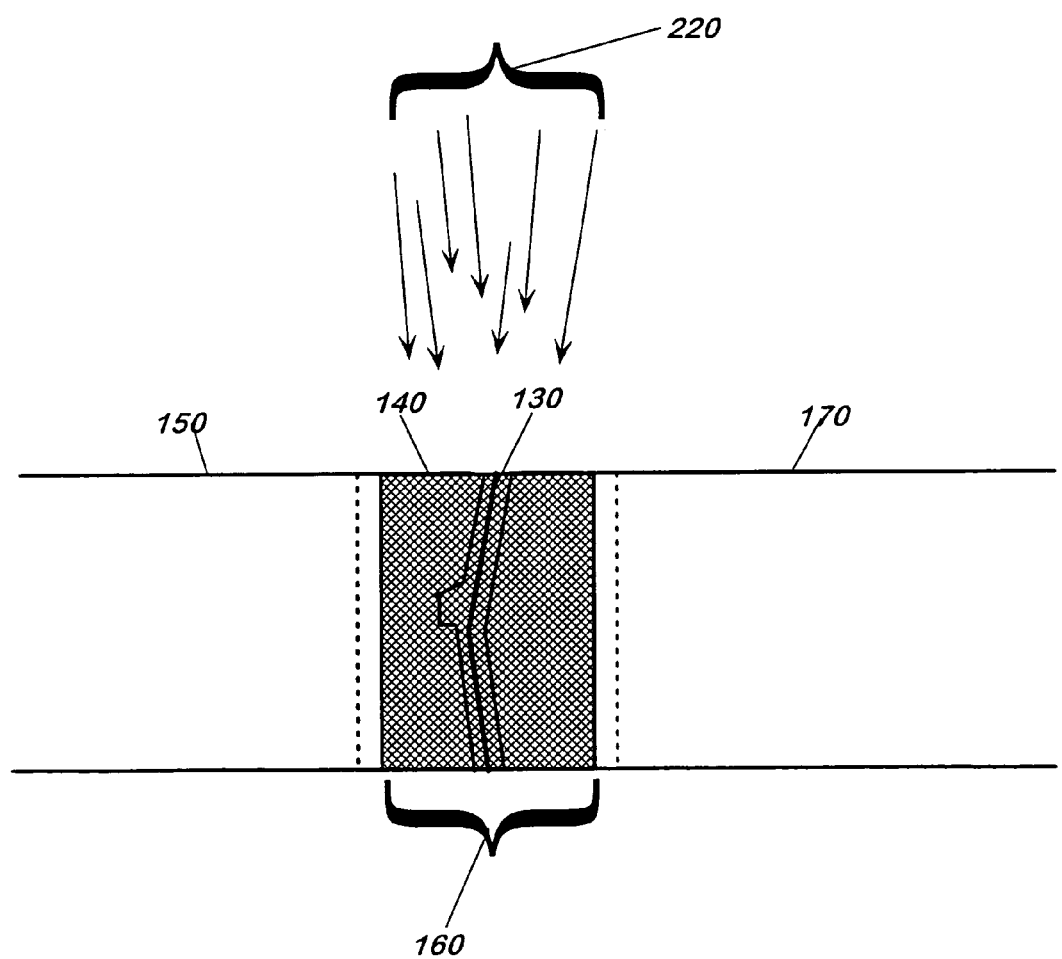
FIG. 2 shows the joint structure featuring the joining material and the base materials being joined during the initial heating phase of the joint area via a localized microwave beam.

FIG. 2 illustrates the joint structure featuring the thin layer of the joining material 140 and the base materials being joined 150, 170 during the initial heating phase of the joint area 160 via a localized microwave beam 220.

Microwave beam heating of materials offer a number of advantages in material processing and particularly in joining operations. One is much shorter processing times than in conventional furnaces. With focused millimeter-wave heating of materials, only the relatively small joint area is heated, minimizing effects of the thermal inertia of the system. This permits very rapid temperature changes. Typically in microwave and millimeter wave systems heating and cooling rates are only limited by two factors—thermal shock of the workpiece and the ability of the workpiece to dissipate heat to the environment during cooling.

Preferably, the beam is a millimeter-wave beam. In an embodiment, heating is accomplished with a 83 GHz, gyrotron-based millimeter-wave processing system with a superconducting magnet. The magnet is cooled by a cryogenic refrigerator to reduce operating costs that can be associated with liquid helium cooling. The gyrotron is capable of a maximum continuous output of 15 kW in a beam about 4–5 cm in diameter. The beam exits the gyrotron through a BN window and is transmitted to the work chamber via a metal transition, contaiing a secondary, sacrificial, TEFLON material coated BN window. The window protects the primary gyrotron window, which should maintain a high vacuum, from corrosive or reactive atmospheres or products of the material processing. Within the work chamber, the beam can be manipulated using gold-plated copper mirrors and reflective lenses, controlled remotely by a three-axis manipulator outside the chamber via a vacuum and gas-tight feedthrough. The work chamber can be constructed of non-magnetic stainless steel, has two access doors, provision for exhausting gases from the chamber, and numerous feedthroughs.

Another major factor in the beam system employed is the ability to localize heating. This is clearly impossible in a conventional furnace or in a microwave cavity system. By employing optics as in the present method, one can focus the beam down to a spot the size of a centimeter. The beam is focused, defocused or shaped by suitable reflective optics. The optics may even be equipped with motorized drives, if desired. This localization of the microwave beam has two important consequences. The first is that the heating can be confined to the joint area in an assembly being joined by this process, minimizing or eliminating heating of the remainder of an assembly. Confining the heating to the joint area eliminates thermal damage to thermally sensitive sub-elements of an assembly, while providing sufficiently high temperatures in the joint region to achieve a high strength, refractory joint in high temperature base materials.

Another related effect which may be used to achieve even greater localization of heating, is that with suitable dielectric properties, the incident millimeter wave beam can be guided down the joint itself, with essentially no energy deposited adjacent to the joint. This effect may be used to heat joints much smaller than the wavelength of the radiation used in current microwave generating "gyrotron" system.

Referring now to FIG. 2 and with continued reference to FIG. 5, localized microwave beam heating is applied to the joint area 160 of the base materials 150, 170. The joint is heated to an initial joining temperature. As shown in FIG. 2, at the initial joining temperature the joining material 140 softens and fills physical discontinuities between the surfaces of the base materials 150, 170 being joined. In the example embodiment, the initial joining temperature is in the range of approximately 800 to 1200 degrees Centigrade depending on the materials selected. The initial joining temperature is selected as a temperature at which the frit softens substantially. The temperature is held for about 15 minutes for alumina material joined by a reactive oxide frit.

Next the joint area is rapidly heated to the reactive temperature of the joining material and the base materials. The reactive temperature is defined as the temperature at which the joining material and the base materials chemically react. This temperature is generally greater than the initial joining temperature. The joint area is heated from the initial joining temperature to the reactive temperature at a rate of approximately 50 to 100 degrees Centigrade per minute. A suitable rate is about 100 degrees Centigrade per minute. In the example embodiment, the reactive temperature is approximately 1400 to 1700 degrees Centigrade.

The joint is then maintained at the reactive temperature for a short interval to allow for the interdiffusion of the base and joining materials and formation of a homogenous joint region. For example, the reactive temperature can be maintained for about 5 minutes.

Figure 3:
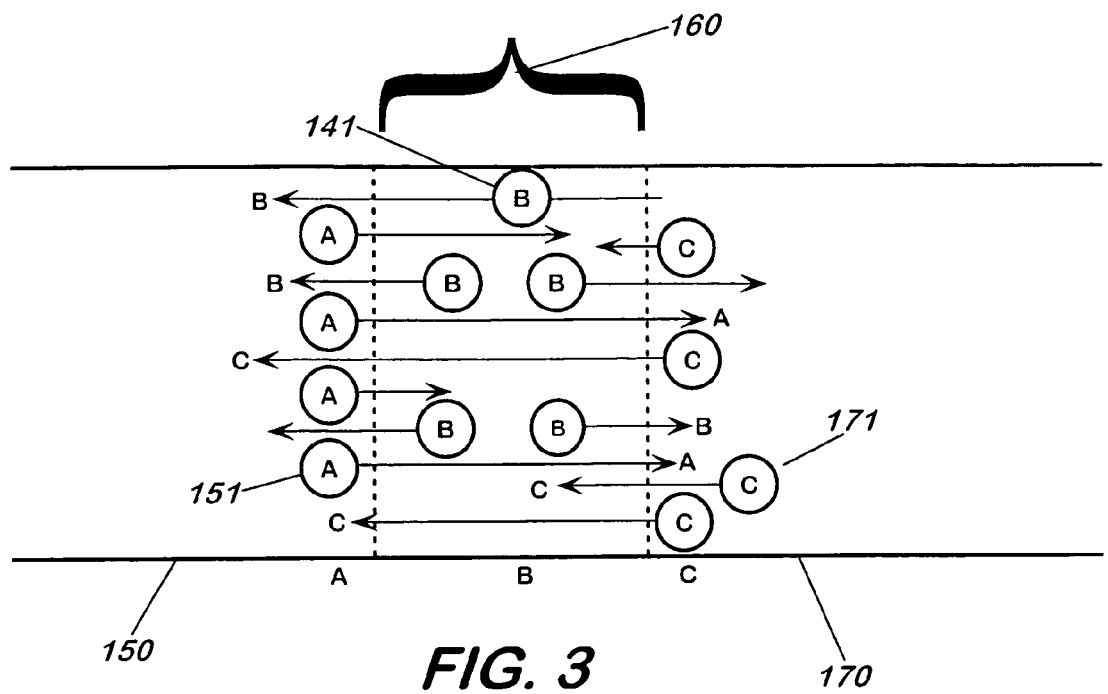
FIG. 3 shows the joint structure featuring the joining material and the base materials being joined during the reactive temperature phase.

FIG. 3 shows an example joint structure featuring the joining material and the base materials being chemically joined during the reactive temperature phase. As shown in the figure, base materials 150 and 170 are separated by a homogenous joint region 160 in which the constituents of the base materials and the joining material become interdiffused. Specifically base material 150 contains constituents represented by the letter "A" 151, while base material 170 contains constituents represented by the letter "C" 171. Base material 140 contains constituents represented by "B" 141. As shown in the figure constituents 151 diffuse into the join area 160 and the base material 170 while constituents 171 from base area 170 diffuse into the joint area 160 and into the base material 150. The constituents of the joining material 141 simultaneously diffuse into the base materials 150, 170, facilitating the formation of a homogenous joint. In a preferred embodiment the joint area is maintained at the reactive temperature for an interval of approximately 10 minutes or more.

Following the reactive temperature phase, the joint is allowed to cool rapidly to the recrystalization temperature. The recrystalization temperature is the temperature at which the joint region, which now has a homogenous composition, begins to attain a stable physical and thermal structure. The recrystalization temperature is well below the intial softening temperature of the frit. The recrystalization temperature is maintained for a predetermined period or generally until an invariant crystal structure is formed in the joint area. The recrystallization/annealing temperature is often 800 to 900 degrees Centigrade.

The joint area is maintained at the recrystallization temperature for approximately 30 minutes, or until the joint area forms a stable physical and thermal structure. Once the joint area forms stable physical and thermal structures, the new assembly is then allowed to cool to room temperature. This process may be through atmospheric cooling for example, with the only requirement being that the assembly is not cooled so quickly as to cause structural or chemical degradation of the base and joint materials. The assembly can be cooled at about 50 degrees C. per minute, for example. The entire cycle time can be about 1.5 to 2 hours, in the example described herein.

Figure 4:
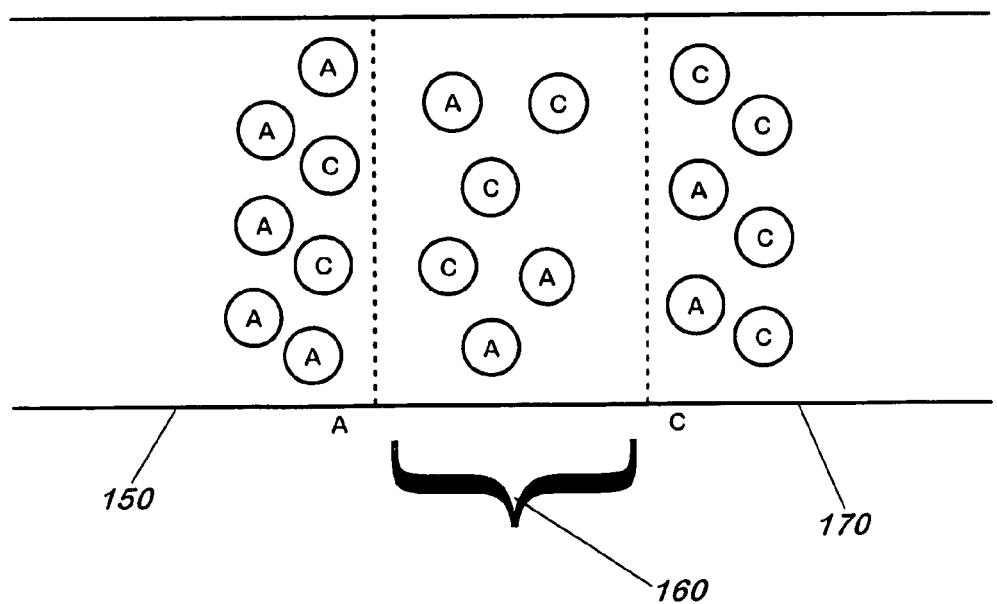
FIG. 4 shows the finished joint structure after recrystalization.

FIG. 4 shows the joint substructure after the recrystalization/annealing process. As one can see from the figure the joint area 160 features a seamless external surface, sharing a near identical chemical and physical structure with the base materials 150, 170. Once the joined structure or component assembly is created, the process may be repeated as many times as necessary allowing subsequent component assemblies or base materials to be added to create the desired multi-component structure.

After a completed joining operation, constituents "B" 141 are fully diffused into base materials 150 and 160. Their concentration in the joint region 160 is diluted to the extent that they have only a negligible and undiscernible effect on the properties of the joint. The joint then contains only homogenized constituents of the high performance base materials "A" 151 and "C" 171.

An additional benefit of use of localized heating by a directed microwave beam during the heating processes is that metal fixtures used to position and hold each base material do not generally reach a temperature above 100 degrees Centigrade. Generally, when other types of heating sources are used, heating effects cannot be contained to only the joint area, thus special heat resistant fixtures must be employed such as fixtures formed from ceramics or some type of heat resistant alloy. With localized microwave beam heating, low cost, low temperature fixtures can be used. Once the joined structure or component assembly is created, the process may be repeated as many times as necessary allowing subsequent component assemblies or base materials to be added to create the desired multi-component structure.

An advantage of using reactive, oxide glass frits is it permits assembly with minimum bonding pressure, since the glass initially softens and flows during the bonding process. Another advantage is that it relaxes requirements for fit and finish in joints—surface flatness and roughness, since the reactive glass frit can fill surface irregularities in a joint. Further, with the use of localized heating, these processes can be used to construct complex assemblies through sequential joining, since previously made joints are not significantly heater. High strength joints can be produced when the glass frit chemistry is properly tailored to the materials being joined. In addition, the resulting joint will have high temperature properties similar to those of the ceramics being joined. This characteristic is useful for systems that require the joined ceramic product to be used at elevated temperatures.

Moreover, the methods outlined herein, when joining oxide ceramics, can be conducted in ambient air and no special processing atmosphers are required. For non-oxide materials, such as SiC, for example, processing can be accomplished in an inert atmosphere such as argon or nitrogen.

Further, the methods disclosed herein also allow some limited stress relief during process, e.g., from joining of dissimilar materials, occurring in the presence of viscous glassy phases in the joint during the processing.

Localization of heating in a beam system has advantages in terms of fixturing and instrumentation for processing and joining. Because the effect of the beam is confined to a small region on the workpiece, typically 2–5 cm in diameter, and the system can contain a water load to absorb any radiation not used to heat the workpiece, there is considerable freedom in the location and types of other devices in the work chamber. For example, the system can also include unshielded fine gage thermocouples (typically with glass fiber or TEFLON material insulation) for temperature measurement.

For purposes of example two or more thin pieces of high purity Alumina, such as WESGO 995, may be joined using the above method to form a complex compound structure. This alumina is of a very high purity, greater than 99.5%. The surfaces of the pieces of alumina to be joined are held together in intimate contact at a low pressure using low temperature fixtures such as those illustrated in FIG. 5. The joint surfaces are thinly coated with a glass frit. In this example embodiment, the frit material selected is a Calcia/Boria/Silica compound, such as the Fusion 588 glass frit. The frit comprises $CaO.B_2O_3.SiO_2$. This material was chosen because it becomes chemically reactive with the base alumina at a temperature as low as 900 degrees C. and the frits softens at even lower temperatures. Further, all the constituents are reactive with aluminum and have refractory products: aluminum borate, mullite, and calcium aluminate.

The frit compositions melt at temperatures ranging from about 1000 degrees C. to about 1400 degrees C.

A localized millimeter wave beam is focused on the joint area, and the joint area is initially heated to approximately 1200 degrees Centigrade. This is the initial joining temperature. At the initial joining temperature the frit material softens and fills physical discontinuities between the surfaces of the base alumina being joined.

Next the joint area is rapidly heated to the reactive temperature, which for purposes of this example, is approximately 1700 degrees Centigrade. The joint area is heated from the initial joining temperature to the reactive temperature at a rate of approximately 100 degrees Centigrade a minute. Once the joint area reaches the reactive temperature, the joint area's temperature is maintained at a constant 1700 degrees Centigrade for approximately 2 minutes. This provides ample time for the alumina and frit materials to interdiffuse.

The joint area is then cooled to the annealing/recrystalization temperature. For a structure using the selected alumina and a $CaO.B_2O_3.SiO_2$ frit material this temperature is approximately 900 degrees C. The joint area is maintained at this temperature for approximately 30 minutes.

The joint area is then allowed to cool to room temperature. The two pieces of Alumina are now joined creating an Alumina compound structure featuring a homogenous joint which shares physical and chemical characteristics very similar to the base alumina.

Once the alumina compound structure has been allowed to cool, complex multi-component assemblies may formed by joining the alumina compound structure with another base material or compound substructure using the above method.

Commercial frit compositions are available from several sources that are suitable for joining, with some modification of their heat treatment schedules. In some cases, custom made formulations and heat treatment schedules can be developed, based on the phase diagrams of the materials involved.

In one embodiment, the materials to be joined are lead-zirconite-titanate (PZT) materials. In this embodiment, the joining material is a submicron $TiO_2$ material filled with silver particles. PZT segments can be joined with a $TiO_2$/Ag reactive braze according the above-described method using an 83 GHz gyrotron generated beam. The method produces a strong bond between the segments, using temperatures high enough to melt the silver while affecting very little of the adjacent material. For the PZT segments, it is desired to produce high strength, fatigue resistant joints between poled PZT segments, where the bulk of the segments would not be taken above 300 degrees C., in order to avoid depoling the PZT segments. A PZT joint formed wtih the 83 GHz beam is about 10–15 μm in width, with a heat affected zone of only 100 μm in width.

Oxide frits can be purchased or developed for other oxide ceramics, and there are analogous formulations available for non-oxide ceramics such as nitrides. In the case of carbides, particularly silicon carbide, similar techniques are possible using reactive brazes containing Si and precursors for SiC and C.

In an exemplary embodiment, the method and system for bonding the materials is based on an 83 GHz gyrotron with superconducting magnet. The magnet is cooled by a cyrogenic refrigerator to reduce the high operating costs associated with liquid helium cooling. The gyrotron is capable of a maximum continuous output of 15 kW in a beam about 4–5 cm in diameter. The beam exits the gyrotron through a BN window and is transmitted to the work chamber via a metal transition, containing a secondary, sacrificial, TEFLON® coated BN window, which protects the primary gyrotron window, which must maintain a high vacuum, from corrosive or reactive atmospheres or products from material processing. Within the work chamber, the beam is manipulated using gold-plated copper mirrors and reflective lenses. These can be controlled remotely by a three-axis manipulator outside the chamber, with vacuum and gas-tight feedthrough. The work chamber is constructed of non-magnetic stainless steel, has two access doors provision for exhausting gases from the chamber, numerous feedthroughs. The chamber is both vacuum-tight and will withstand overpressures of about 1 atm. The system has been operated with a range of processing atmospheres—vacuum, air, nitrogen, argon, and nitrogen-hydrogen mixtures. A non-outgassing water load is placed in the chamber to absorb any millimeter-wave radiation not absorbed in the workpiece. Process instrumentation that is placed in the work chamber and read out through feedthroughs includes three thermocouples of Type K or S, and a low temperature (400° C.) infrared thermometer. A two color optical pyrometer is used to measure temperature optically at the workpiece, sighting through a shielded viewport. The entire system is operated with a PC-based LabView™ software system that incorporates numerous interlocks and safety features to ensure safe operation of the gyrotron-based processing system. The LabView™ system also provides for data acquisition and storage from the process monitoring instrumentation and a record of the operating parameters of the gyrotron system as well. With many types of processing, the automated operating system permits conducting many types of processing in the system with a single operator.

Millimeter-wave beam heating of materials offer a number of advantages in material processing and particularly in joining operations. One is much shorter processing times than in conventional furnaces. With microwave or millimeter-wave heating of materials, only the workpiece is heated, minimizing the thermal inertia of the system. This permits very rapid temperature changes, provided that sufficient power is available. Typically in microwave and millimeter wave systems heating and cooling rates are limited by two factors—the thermal shock of the workpiece and the ability of the workpiece to dissipate heat to the environment during cooling. Basically, heating can be as rapid as the material being heated will tolerate. Heating rates as high as 100° C./min, and up to 1000° C./min, are suitable. Cooling is controlled by the thermal mass and conductivity of the workpiece, and its ability to dissipate heat to the work environment by radiation, convection or conduction. Cooling rates for small samples can be of 100° C./min if the millimeter-wave power is simply turned off.

Another advantage of the gyrotron based millimeter wave beam system is the ability to localize heating. This is difficult or impossible in a conventional furnace or in a microwave cavity system. In contrast, the millimeter wave beam generated by the gyrotron can be focused with optics down to a spot size of a centimeter. The beam can readily be focused, defocused or shaped by suitable reflective optics. If the optics are equipped with motorized drives, the beam can be rastered in a controlled manner across a workpiece. This localization has two important consequences. First, the heating can be confined to the joint region in an assembly being joined by this process, minimizing or eliminating heating of the remainder of an assembly. This can eliminate thermal damage to thermally sensitive subelements of an assembly, while providing sufficiently high temperatures in the joint region (e.g., 1400–1500° C.) to achieve a high strength, refractory joint in high temperature materials. A related effect can be used to achieve even greater localization of heating, in which, with suitable dielectric properties, the incident millimeter-wave beam is guided down the joint itself, with essentially no energy deposited adjacent to the joint. This effect can be used to heat joints much smaller than the wavelength (3.6 mm) of the radiation used in the gyrotron system. In one example, PZT segments are joined with a reactive braze ($TiO_2$/Ag), which produced a strong bond between the segments, achieving temperatures high enough to melt the silver, while affecting very little of the adjacent material. This provides the capability to produce high strength, fatigue resistant joints between poled PZT segments, where the bulk of the segments cannot taken above 300° C. without depoling the segments. A joint was produced between the PZT segments with a 10–15 μm wiidth and a heat-affected zone (HAZ) of only 100 μm in width.

Localization of heating in a beam system also has large operational advantages in terms of fixturing and instrumentation for processing or joining. Because the effect of the beam is confined to a small region on the workpiece, typically 2–5 cm in diameter, and the system can include a water load to absorb any radiation not used to heat the workpiece, there is considerable freedom in the location and types of other devices in the work chamber. For example, the system can include unshielded fine gage thermocouples (typically with glass fiber or TEFLON® insulation) for temperature measurement. Only EM shielding of the plastic thermocouple connectors is needed. This is conveniently done with copper tape. A low temperature IR thermometer also can be employed in the chamber, which only requires shielding of its lead with copper braid and a fine mesh screen over the aperture to the optics.

An important byproduct of the beam heating is the freedom to use almost any material for fixturing for providing alignment of pieces being joined and for applying pressure to the joints. In a conventional furnace system, such fixturing would have to be made either of superalloys or from high temperature ceramics, would be very costly to produce, and usually would require a long lead time for acquisition. In a microwave cavity system, this is virtually impossible because of the high electric fields present throughout the cavity and the resultant arcing at conductive objects and heating of insulating materials. In the millimeter wave energy gyrotron system described herein, the fixtures can be steel and BN. BN is a convenient ceramic material that is relatively low cost, easily machinable using conventional machining tools, and is non-reactive with most other ceramics. Although steel fixtures can be custom built for application of pressure, small machinists vises are also suitable.

A system for rotating components under the beam during millimeter-wave joining processes is also possible, using mostly commercial components and a sealed DC gearmotor with power coming into our chamber through a feedthrough for variable rotational speed on the workpiece. Such a system in a conventional furnace system would be extremely difficult and expensive to produce, and would require large costs to adapt to different joint geometries.

In an experimental setup, two thermocouples measure the temperature of the vise and the temperature at the lower surface of the alumina segments. The temperature at the top surface is read via a two color optical pyrometer. Pressure is applied to the stack of alumina segments through BN spacers and alumina tubular insulators. In addition, fine tantalum foil is used as a radiation shield, both for electromagnetic and IR, to confine the beam energy, effectively producing a mini-cavity around the workpiece. This experimental arrangement permits heating the alumina joint segments to temperatures over 1500° C., with the metal fixturing never reaching more than 50° C.

Other advantages in joining high temperature ceramics derive from the use of reactive brazes to join the ceramics, for example, reactive oxide glass frits for joining high temperature oxides. The use of such joint materials permits assembly with minimal bonding pressure, since the glass initially softens and flows during the bonding process. It also relaxes requirements for fit and finish in joints—surface flatness and roughness, since the reactive glass frit can fill surface irregularities in a joint. With the use of localized heating, the process can be used to construct complex assemblies through sequential joining, since previously made joints are not significantly heated. High strength joints can be produced when the glass frit chemistry is properly tailored to the materials being joined.

In addition, with proper heat treatment, the joint materials can be recrystallized, leaving a refractory, crystalline joint, that should have high temperature properties similar to those of the ceramics being joined. This is especially desirable since ceramics are frequently used in high temperature applications. When joining oxide ceramics, the process is conducted in ambient air; no special processing atmospheres are required. For non-oxide materials such as SiC, processing can be done in inert atmospheres such as argon or nitrogen. Finally, because of the presence of viscous glassy phases in the joint during processing, there is the opportunity for some limited stress relief during the joining process, e.g., from joining of dissimilar materials.

Commercial frit compositions are available from several sources that are usable for the purpose of joining, with some modifications of heat treatment schedules. In some cases, custom made formulations and heat treatment schedules can be developed, based on phase diagrams of the materials involved. In an exemplary PZT joint formed by a method according to the invention, the braze was chosen based on several constraints. One of these was reactivity with the PZT material and the ability to form intermediate compounds. A second was the need to have a conductive joint in the final product. A third was the requirement to have the particular dielectric properties in the braze material, to produce a guided wave propagating down the joint region. These were all satisfied with the use of a submicron $TiO_2$ material filled with fine silver particles. In the case of alumina joints, a commercial oxide glass frit normally used for sealing of alumina components can be selected, with a heat treatment schedule to provide for a strong, refractory crystalline joint in the product. The $CaO$—$B_2O_3$—$SiO_2$ oxide frit selected is reactive with alumina, contains constituents which diffuse into the alumina, while the aluminum in the alumina diffuses into the frit, and has a relatively low softening point for purposes of easy sealing. All of the constituents are reactive with alumina and have refractory products: aluminum borate, mullite, and calcium aluminate. The frit contains useful compositions that melt at temperatures ranging from about 1000 to 1400° C.

Similar oxide frits can be purchased or developed for other oxide ceramics, and there are analogous formulations for non-oxide ceramics such as nitrides. In the case of carbides, particularly silicon carbide, similar techniques are possible using reactive brazes containing Si and precursors for SiC and C.

In joining various types of aluminum oxide materials with the millimeter-wave beam system, suitable size specimens of the aluminas are sectioned from billets or other stock and ground as necessary. The specimens can be used as saw cut, with no further preparation of the mating surfaces. Alternatively, the joints can be made with the as-fabricated surfaces on commercial aluminas. A frit suspension, typically either 20 or 40 v/o frit in butanol is prepared using a commercial fluorocarbon dispersant in small quantities (<0.1%). The frit is dispersed in the butanol using small zirconia milling media and mild agitation. The surfaces to be joined are then coated with this suspension and immediately assembled into the final configuration. Assembly of specimens to be joined can be done in small machinists vises, with clamping pressure adjusted to apply about 0.5° MPa pressure to the joint areas. The alumina joining specimens are thermally isolated from the vises using alumina tubes, BN spacers placed between the alumina tubes and joining specimens to inhibit bonding. The assemblies were allowed to air dry for about one hour prior to processing in the millimeter wave system. A Type K or S thermocouple for example, depending on expected process temperatures, is placed beneath the joining specimens, with the thermocouple tip touching the bottom of the specimens. A two color optical pyrometer is used to measure the upper surface temperature of the joint specimens, at temperatures-above 700° C. Additional thermocouples can be used to monitor the temperature of the fixturing and of the chamber environment. A metal foil radiation shield cab placed around the specimens. A sufficiently large gap is left to permit entry of the millimeter-wave beam and sighting of the specimen top surface by the pyrometer.

Figure 6:
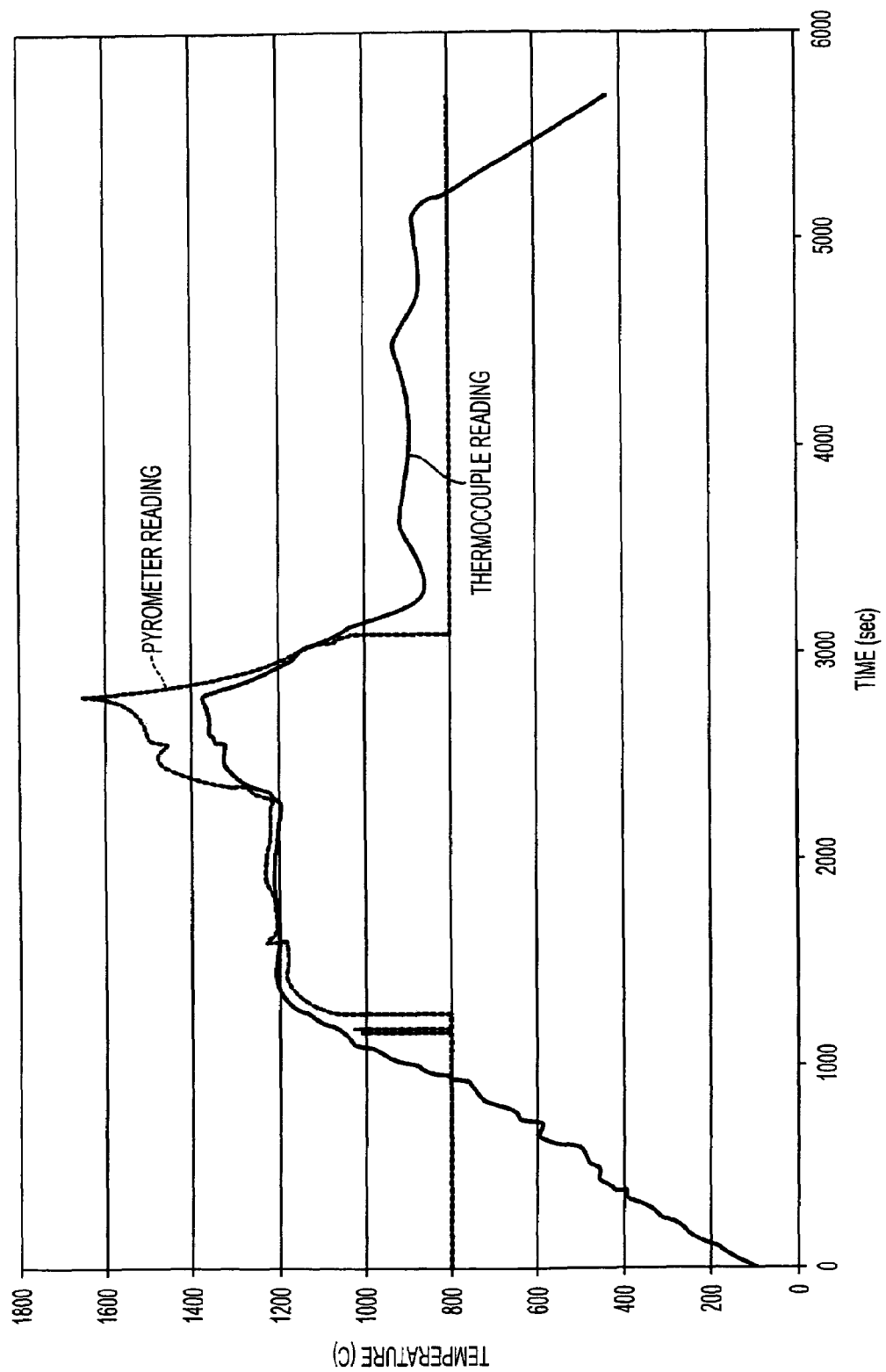
FIG. 6 shows a heat treatment schedule in accordance with an exemplary method of the invention.

In actual processing, the joining assembly and fixturing are placed in the millimeter-wave work chamber and located relative to the position of the beam, with the beam optics adjusted to provide the desired size and shape of the beam at the top surface of the joining specimens. With this done, the specimens are subjected to selected heat treatment schedules, as shown in Table 1 and FIG. 6, for example.

In most cases, the specimens are brought up to an initial hold temperature at a rate of 50–100° C./min. The initial hold temperature is selected as one where the glass frit softened substantially. This temperature was held for about 15 minutes, followed by a rapid ramp at 50–100° C./min. to an elevated temperature to permit interdiffusion and inter-reaction between the frit and the alumina. After a short hold, ca. 5 minutes, at this temperature, the temperature is rapidly reduced to a lower temperature, well below the initial softening temperature, and held for a longer time, approx. 30 minutes, to permit recrystallization of the products of the joining process. Following this hold, the assembly is then cooled down at about 50° C. per minute, or as fast as heat transfer allowed to room temperature. The entire cycle time was approximately 1.5–2 hours. Following joining, some assemblies are sectioned for optical and electron microscopy of the joint regions. Initially joint strengths are estimated from the force necessary to separate joined specimens using a wedge placed on the joint line. Double lap shear strength specimens can be typically fabricated in groups of three in one run to provide better statistics on strength for specimens processed identically. These specimens can be tested to failure in compression on a universal testing machine. The shear strength of the joints is calculated from the maximum load obtained and the area of the joints. The stress distributions in the joints are such that the peak stresses are higher than the values calculated, and most of the errors possible in this type of test will result in further lowering of the strength values measured. In a series of experiments, various heat treatment schedules were evaluated, together with various modifications of the fit suspension system. Optical microscopy and scanning electron microscopy are used evaluate fracture surfaces, joint morphology and microstructure, and joint chemistry is evaluated through EDAX.

As an example, joints can be produced in a technical grade alumina using a simpler heat treatment schedule. These joints still contain significant amounts of residual glassy phase in the joint region, but exhibit shear strengths of about 50 MPa (7 ksi). This strength is comparable to what might be achieved using high strength structural adhesives, but the reactive glass braze joints should be usable up to the softening temperature of the residual glassy phases, approx. 1000° C. The residual glassy phase is clearly evident in FIG. 8 below as a darker band approx. 50–100 µm in width. One feature of note here is the effectiveness of the technique in filling the relatively rough surfaces on the as-sawn surfaces used for joining.

With the proper heat treatment schedule, substantially higher joint strengths were achieved, and the nature of the joints changed dramatically. Good strength results are obtained in both technical grade aluminas and high purity (99.8%) aluminas. While the joint region is somewhat darker than the bulk high purity alumina, due to the different composition, the joint region is well crystallized. In many areas, the joint region is indistinguishable from the adjacent alumina in the SEM.

In one series of experiments, joints are made to join low and high purity aluminas, where the impurity content of the low purity aluminas would make possible a better analysis of the interdiffusion occurring during joining. To facilitate microscopic and elemental analysis of the joint region, these samples are sectioned on about a 30° angle to provide about a 2:1 magnification of the joint region. Substantial interdiffusion does occur during the joining process. This indiffusion is important to the success of the heat treatment in recrystallizing the joint subsequent to joining.

The strength results obtained in a number of these joining experiments are summarized in Table I below. This table shows the material, temperature profile, hold times and measured shear strengths. The three temperatures referenced as A, B and refer to the initial hold temperature for braze softening and bonding, a second higher temperature for interdiffusion, and a third, lower temperature for recrystallization of the products, respectively.

TABLE I

| Material | # of tests | Temp | Time (min) | Shear Strength (MPa) |
| --- | --- | --- | --- | --- |
| Coors AD995 | 4 | B | 15–18 | 23 |
| Wesgo AL 500 (94%) | 3 | A | 15 | 38 |
|  | 1 | A-B-C | 15/2/30 | 20 |
| Wesgo AL 300 (97.6%) | 1 | B | 11.5 | 20 |
|  | 3 | B | 15 | 59 |
|  | 2 | B | 35 | 42 |
| Wesgo AL 995 (99.5%) | 3 | B-C | 2/30 | 20 |
|  | 2 | A-C | 15/30 | 84 |
| Wesgo AL 995 (99.5%) | 2 | A-B-C | 15/4/30 | 102 |
|  | 1 | A-B +200° C.-C | 15/2/30 | 120 |

Of note above is that the best results, in terms of shear strength, are obtained with the highest purity aluminas. These are typically the most difficult to join, because of their refractory nature and their chemical inertness. It is also expected that, as mentioned previously, these strengths will persist to very high temperatures, perhaps as high as 1400–1500° C., based on the nature of the compounds formed during the recrystallization process. Also note that the strength values above, in the better cases, may be underestimates of the true strength. Thus, the joints are probably as strong in shear as the base material, with a nominal shear strength of about 200 MPa.

Although this invention has been described in relation to the exemplary embodiments thereof, it is well understood by those skilled in the art that other variations and modifications can be affected on the preferred embodiment without departing from scope and spirit of the invention as set forth in the claims.

The invention claimed is:

1. A method for bonding materials using localized microwave energy comprising:
    applying a thin coating of a joining material to each surface of the base materials being joined;
    disposing each said base material such that the surface of the base materials being joined form a joint area and are in contact with the desired alignment and pressure necessary for maintaining the contact between the materials and creating the desired component assembly;
    heating said joint area with a microwave beam applied to the surfaces of the base material being joined to achieve localized heating of the joint area, said heating including:
        heating said joint area to an initial joining temperature, wherein said joining material softens and fills physical discontinuities between the surfaces of the base materials being joined, and
        rapidly heating said joint area to the reactive temperature of the joining material and the base materials;
    maintaining said joint area at said reactive temperature to allow for the interdiffusion of the base and joining materials and formation of a homogenous joint region;
    rapidly cooling said joint area to a recrystalization temperature and maintaining said joint area at the recystalization temperature for a predetermined period; and
    slowly cooling said joint area to room temperature.

2. The method of claim 1 wherein said joining material is a frit selected such that at a predetermined temperature the constituents of the frit material will chemically react and diffuse into the base material to form stable refractory compounds.

3. The method of claim 2 wherein said joining material is chemically reactive with the base material at a temperature below that of the thermal degradation threshold of the base material.

4. The method of claim 1 wherein said base materials are disposed and joined to create the desired assembly by employing low temperature fixtures to align said base materials and provide pressure to said joint area in the desired manner to produce the completed structure.

5. The method of claim 4 wherein said fixtures do not reach a temperature above 100 degrees Centigrade during the heating phases of the joining process.

6. The method of claim 4 wherein said low temperature fixtures do not reach temperatures above 100 degree Centigrade.

7. A method according to claim 4, wherein the low temperature fixtures comprise at least one of a steel and a boron nitride ceramic.

8. The method of claim 1 wherein said initial joining temperature is approximately 800 to 1200 degrees Centigrade.

9. The method of claim 1 wherein said joint area is heated from the initial joining temperature to said reactive temperature at a rate of approximately 100 degrees Centigrade a minute.

10. The method of claim 1 wherein said reactive temperature is approximately 1500 to 1700 degrees Centigrade.

11. The method of claim 1 wherein said joint area is maintained at the reactive temperature for an interval of approximately 10 minutes.

12. The method of claim 1 wherein said recrystallization temperature is approximately 800 to 900 degrees Centigrade.

13. The method of claim 1 wherein said joint area is maintained at the recrystallization temperature for approximately 30 minutes, or until the joint area forms a stable physical and thermal structure.

14. The method of claim 1 wherein said base materials are high purity oxide materials.

15. The method of claim 1, further comprising:
transmitting the beam through optics toward the joint area.

16. The method of claim 1, wherein the beam has a diameter of at most five centimeters.

17. The method of claim 1, wherein the beam has a diameter of between four and five centimeters.

18. The method of claim 1, wherein the beam has a spot size of one centimeter.

19. The method of claim 1, wherein said localized heating is limited to an area with a diameter of two to five centimeters.

20. The method of claim 1, further comprising:
maintaining said joint area at the initial joining temperature for a predetermined period.

21. The method of claim 1, wherein the initial joining temperature is about 1200 degrees C.

22. The method of claim 1, wherein said rapidly heating said joint area to the reactive temperature of the joining material and the base materials comprises heating at a rate of 50 degrees C. per minute to 100 degrees C. per minute.

23. The method of claim 1, wherein the joint area is maintained at the reactive temperature for about five minutes.

24. The method of claim 1, wherein the joining material is chemically reactive with alumina at 900 degrees C.

25. The method of claim 1, wherein the base material is alumina.

26. The method of claim 1, wherein the joining material is a glass frit comprising calcium oxide.

27. A method for bonding base materials using localized millimeter wave energy comprising:
applying a joining material to coat each surface of the base materials being joined,
disposing each said base material such that the coated surfaces of the base materials being joined are in contact and form a joint area,
heating said joint area with a millimeter wave beam to an initial joining temperature,
heating said joint area with a millimeter wave beam from the initial joining temperature to a reactive temperature of the joining material and the base materials,
maintaining said joint area at said reactive temperature for a predetermined period,
cooling said joint area to a recrystalization temperature,
maintaining said joint area at the recrystalization temperature for a predetermined period, and
cooling said joint area to a temperature below the recrystalization temperature.

28. A method according to claim 27, wherein the millimeter wave beam is generated by a gyrotron.

29. A method according to claim 27, wherein said heating said joint area to the reactive temperature of the joining material and the base materials comprises heating at a rate of 50 degrees C. per minute to 100 degrees C. per minute.

30. A method for bonding materials using localized millimeter wave energy comprising:
applying a thin coating of a joining material, which is chemically reactive with the base material at a predetermined temperature, to each surface of the base materials being joined,
disposing each said base material such that the surface of the base materials being joined form a joint area and are in contact with the desired alignment and pressure necessary for maintaining contact between the base materials and creating the desired component assembly,
heating said joint area with a beam of millimeter wave energy applied to the surfaces of the base material being joined to achieve localized heating of the joint area, said heating including:
heating said joint area to an initial joining temperature, wherein said joining material softens and fills physical discontinuities between the surfaces of the base materials being joined, and
rapidly heating said joint area to the reactive temperature of the joining material and the base materials,
maintaining said joint area at said reactive temperature to allow for the interdiffusion of the base and joining materials such that the reactive material diffuses away into the bonded base material forming of a homogenous joint region,
rapidly cooling said joint area to a recrystalization temperature;
maintaining said joint area at the recrystalization temperature for a predetermined period, and cooling said joint area to room temperature.

31. The method of claim 30, wherein said rapidly heating said joint area to the reactive temperature of the joining material and the base materials comprises heating at a rate of 50 degrees C. per minute to 100 degrees C. per minute.

32. The method of claim 30, wherein the millimeter wave energy has a frequency of 83 GHz.

* * * * *